United States Patent
An et al.

(10) Patent No.: US 10,476,945 B2
(45) Date of Patent: Nov. 12, 2019

(54) CONSISTENT FLOW ASSIGNMENT IN LOAD BALANCING

(71) Applicant: Juniper Networks, Inc., Sunnyvale, CA (US)

(72) Inventors: Yafan An, Fremont, CA (US); Rajani K. Dadi, San Jose, CA (US); Amit Prakash Patil, Sunnyvale, CA (US); Shunmugavel Rajarathinam, Alviso, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 331 days.

(21) Appl. No.: 15/421,950

(22) Filed: Feb. 1, 2017

(65) Prior Publication Data

US 2018/0219941 A1   Aug. 2, 2018

(51) Int. Cl.
*H04L 29/08* (2006.01)
*H04L 12/911* (2013.01)
(Continued)

(52) U.S. Cl.
CPC ........ *H04L 67/1002* (2013.01); *G06F 9/4881* (2013.01); *G06F 9/5083* (2013.01);
(Continued)

(58) Field of Classification Search
CPC .... G06F 9/4881; G06F 9/5005; G06F 9/5027; G06F 9/5033; G06F 9/5083;
(Continued)

(56) References Cited

U.S. PATENT DOCUMENTS

| | | | | |
|---|---|---|---|---|
| 6,327,622 | B1* | 12/2001 | Jindal | ................. H04L 67/1002 709/228 |
| 6,779,039 | B1* | 8/2004 | Bommareddy | ..... H04L 67/1023 709/226 |

(Continued)

FOREIGN PATENT DOCUMENTS

| | | |
|---|---|---|
| EP | 1832085 A1 | 9/2007 |
| EP | 2629490 A1 | 8/2013 |

(Continued)

OTHER PUBLICATIONS

Phillips et al. "Online load balancing and network flow," Proceedings of the 25th Annual ACM Symposium on Theory of Computing, 1993, pp. 402-411 (Year: 1993).*

(Continued)

*Primary Examiner* — Vivek Srivastava
*Assistant Examiner* — William C McBeth
(74) *Attorney, Agent, or Firm* — Harrity & Harrity, LLP

(57) ABSTRACT

A device may receive first information identifying multiple server devices and second information identifying multiple flows. The device may assign the multiple flows to the multiple server devices in a first order. The device may store the second information in multiple data structures to record the assignment of the multiple flows to the multiple server devices. A data structure, of the multiple data structures, may correspond to a respective server device of the multiple server devices. The device may receive an indication that a server device has been added to, or removed from, the multiple server devices after storing the second information. The device may reassign a subset of the multiple flows in a second order using third information identifying an order in which the multiple flows were assigned to the multiple server devices. The second order may be different from the first order.

20 Claims, 6 Drawing Sheets

(51) Int. Cl.
  *G06F 9/48* (2006.01)
  *G06F 9/50* (2006.01)
(52) U.S. Cl.
  CPC ............ *G06F 9/5088* (2013.01); *H04L 47/70* (2013.01); *H04L 67/1004* (2013.01); *H04L 67/1017* (2013.01); *H04L 67/1029* (2013.01); *H04L 67/1031* (2013.01); *H04L 67/1034* (2013.01)
(58) Field of Classification Search
  CPC ... G06F 9/5088; H04L 47/70; H04L 67/1002; H04L 67/1004; H04L 67/101; H04L 67/1017; H04L 67/1023; H04L 67/1027; H04L 67/1029; H04L 67/1031; H04L 67/1034
  See application file for complete search history.

(56) References Cited

U.S. PATENT DOCUMENTS

| | | | | |
|---|---|---|---|---|
| 7,990,847 | B1* | 8/2011 | Leroy | H04L 67/1002 370/216 |
| 2002/0054567 | A1* | 5/2002 | Fan | H04L 67/1002 370/230 |
| 2003/0236888 | A1* | 12/2003 | Chauffour | H04L 67/1029 709/226 |
| 2004/0243709 | A1* | 12/2004 | Kalyanavarathan | H04L 67/1017 709/226 |
| 2004/0268358 | A1* | 12/2004 | Darling | H04L 67/1002 718/105 |
| 2006/0233106 | A1* | 10/2006 | Achlioptas | H04L 67/1002 370/235 |
| 2008/0228926 | A1* | 9/2008 | Shiratzky | H04L 67/1002 709/228 |
| 2013/0155902 | A1* | 6/2013 | Feng | H04L 67/1031 370/255 |
| 2013/0297798 | A1* | 11/2013 | Arisoylu | H04L 67/1023 709/226 |
| 2014/0304415 | A1* | 10/2014 | Prakash | H04L 47/70 709/226 |
| 2014/0310418 | A1* | 10/2014 | Sorenson, III | H04L 67/1002 709/226 |
| 2015/0081762 | A1* | 3/2015 | Mason | H04L 67/1023 709/203 |
| 2016/0072713 | A1* | 3/2016 | Mhatre | H04L 67/1029 709/235 |
| 2016/0182378 | A1* | 6/2016 | Basavaraja | H04L 67/1002 370/235 |
| 2016/0373520 | A1* | 12/2016 | Kumar | H04L 67/1031 |
| 2018/0007126 | A1* | 1/2018 | Borst | H04L 67/1031 |

FOREIGN PATENT DOCUMENTS

| | | |
|---|---|---|
| EP | 2940580 A1 | 11/2015 |
| WO | WO 2006/065691 A1 | 6/2006 |

OTHER PUBLICATIONS

Teodoro et al. "Load balancing on stateful clustered Web servers," Proceedings. 15th Symposium on Computer Architecture and High Performance Computing, 2003, pp. 207-215 (Year: 2003).*
Li et al. "Dynamic Load Balancing Algorithm Based on FCFS," 2009 Fourth International Conference on Innovative Computing, Information and Control (ICICIC), 2009, pp. 1528-1531 (Year: 2009).*
Saboori et al. "A new scheduling algorithm for server farms load balancing," 2010 2nd International Conference on Industrial and Information Systems, 2010, pp. 417-420 (Year: 2010).*
Mahmood et al. "Comparison of load balancing algorithms for clustered web servers," Proceedings of the 5th International Conference on Information Technology & Multimedia, 2011, pp. 1-6 (Year: 2011).*
Rahman et al. "Load Balancer as a Service in Cloud Computing," 2014 IEEE 8th International Symposium on Service Oriented System Engineering, 2014, pp. 204-211 (Year: 2014).*
Microsoft Developer, "Consistent Hashing—Theory & Implementation," https://blogs.msdn.microsoft.com/csliu/2009/09/17/consistent-hashing-theory-implementation/, Sep. 17, 2009, 4 pages.
Michael Nielsen, "Consistent hashing," http://michaelnielsen.org/blog/consistent-hashing/, Jun. 3, 2009, 5 pages.
John Lamping et al. "A Fast, Minimal Memory, Consistent Hash Algorithm," https://arxiv.org/ftp/arxiv/papers/1406/1406.2294.pdf, Jun. 9, 2014, 12 pages.
Tim Roughgarden et al. "CS168: The Modern Algorithmic Toolbox Lecture #1: Introduction and Consistent Hashing," http://theory.stanford.edu/~tim/s16/I/I1.pdf, Mar. 28, 2016, 11 pages.
Mark P Neyer, "A Comparison of Dictionary Implementations," https://www.cs.unc.edu/~plaisted/comp550/Neyer%20paper.pdf, Apr. 10, 2009, 7 pages.
Wikipedia, "Red-black tree," https://en.wikipedia.org/wiki/Red%E2%80%93black_tree, Jan. 20, 2017, 20 pages.
Extended European Search Report corresponding to EP 17193536.4, dated Jun. 4, 2018, 10 pages.

* cited by examiner

CONSISTENT FLOW ASSIGNMENT IN LOAD BALANCING

BACKGROUND

In computing, load balancing improves the distribution of workloads across multiple computing resources, such as data flows from client devices distributed across multiple server devices. Load balancing aims to optimize resource use, maximize throughput, minimize response time, and avoid overload of any single resource.

SUMMARY

According to some possible implementations, a device may include one or more processors to receive first information identifying multiple server devices and second information identifying multiple flows, where the multiple flows are to be assigned to the multiple server devices. The one or more processors may assign the multiple flows to the multiple server devices in a first order based on receiving the first information and the second information and without using a modulo operation. The one or more processors may store the second information in multiple data structures to record assignment of the multiple flows to the multiple server devices based on assigning the multiple flows to the multiple server devices. A data structure, of the multiple data structures, may correspond to a respective server device of the multiple server devices. The one or more processors may receive an indication that a first server device has been added to, or removed from, the multiple server devices after storing the second information. The one or more processors may reassign, based on receiving the indication, a subset of the multiple flows in a second order using third information identifying an order in which the multiple flows were assigned to the multiple server devices. The second order may be different from the first order.

According to some possible implementations, a non-transitory computer-readable medium may store one or more instructions that, when executed by one or more processors, cause the one or more processors to receive first information identifying a plurality of server devices and second information identifying a plurality of flows destined for the plurality of server devices where the plurality of flows are to be assigned to the plurality of server devices or a plurality of links between a network device and the plurality of server devices. The one or more instructions, when executed by the one or more processors, may cause the one or more processors to assign the plurality of flows to the plurality of server devices in a first order based on receiving the first information and the second information. The one or more instructions, when executed by the one or more processors, may cause the one or more processors to store the second information in a plurality of data structures to record assignment of the plurality of flows to the plurality of server devices based on assigning the plurality of flows to the plurality of server devices. A data structure, of the plurality of data structures, may correspond to a respective server device of the plurality of server devices. The one or more instructions, when executed by the one or more processors, may cause the one or more processors to receive an indication that a first server device has been added to, or removed from, the plurality of server devices after storing the second information. The one or more instructions, when executed by the one or more processors, may cause the one or more processors to reassign a subset of the plurality of flows in a second order using third information identifying an order in which the plurality of flows were assigned to the plurality of server devices based on receiving the indication. The second order may be opposite the first order.

According to some possible implementations, a method may include receiving, by a device, first information identifying multiple server devices and second information identifying multiple flows, where the multiple flows are to be assigned to the multiple server devices. The method may include assigning, by the device, the multiple flows to the multiple server devices in a first order based on receiving the first information and the second information. The method may include storing, by the device, the second information in multiple data structures to record the assignment of the multiple flows to the multiple server devices based on assigning the multiple flows to the multiple server devices. A data structure, of the multiple data structures, may correspond to a respective server device of the multiple server devices. The method may include receiving, by the device, an indication that a server device has been added to, or removed from, the multiple server devices after storing the second information. The method may include reassigning, by the device, a subset of the multiple flows in a second order using third information identifying an order in which the multiple flows were assigned to the multiple server devices based on receiving the indication. The second order may be different from the first order.

DETAILED DESCRIPTION

The following detailed description of example implementations refers to the accompanying drawings. The same reference numbers in different drawings may identify the same or similar elements.

A network device may load balance data flows from client devices onto a group of server devices to prevent one of the server devices from becoming overloaded. One method for load balancing multiple flows includes generating a hash value for a particular flow and assigning the flow to a server device based on a result of a modulo operation of the hash value and the quantity of server devices. This method may cause most, or an increased quantity, of the flows to be reassigned to server devices when a server device is added to or removed from a network, because the divisor of the modulo operation changes when there is a change to the quantity of server devices to which flows are to be assigned. In addition, interruption to a flow may result in overhead related to restarting a job/service, thrashing, and/or the like, the effects of which may increase with scale (e.g., an increased quantity of flows interrupted, an increased quantity of client devices affected, etc.).

Implementations described herein may assign flows to server devices in a round-robin manner, or another manner, may use a stack data structure (e.g., that tracks an order of assignment of flows) for each server device to store information identifying the flows assigned to each server device, and may reassign the flows from one server device to another server device in a last assigned, first reassigned manner using the stack data structure.

In this way, implementations described herein minimize a quantity of flows to a set of server devices that are reassigned when a server device is added to or removed from a network (e.g., rather than reassigning all flows), thereby conserving processing resources and/or minimizing interruptions to server device processing of client services. Furthermore, implementations described herein more evenly distribute flows relative to hash-based load balancing, thereby maximizing use of processing resources of the server devices. Furthermore, implementations described herein increase an efficiency of rebalancing flows when a server is added to, or removed from, a network by reducing a quantity of flows that need to be rebalanced, and/or by reducing an amount of time needed for rebalancing the flows.

Figure 1A:
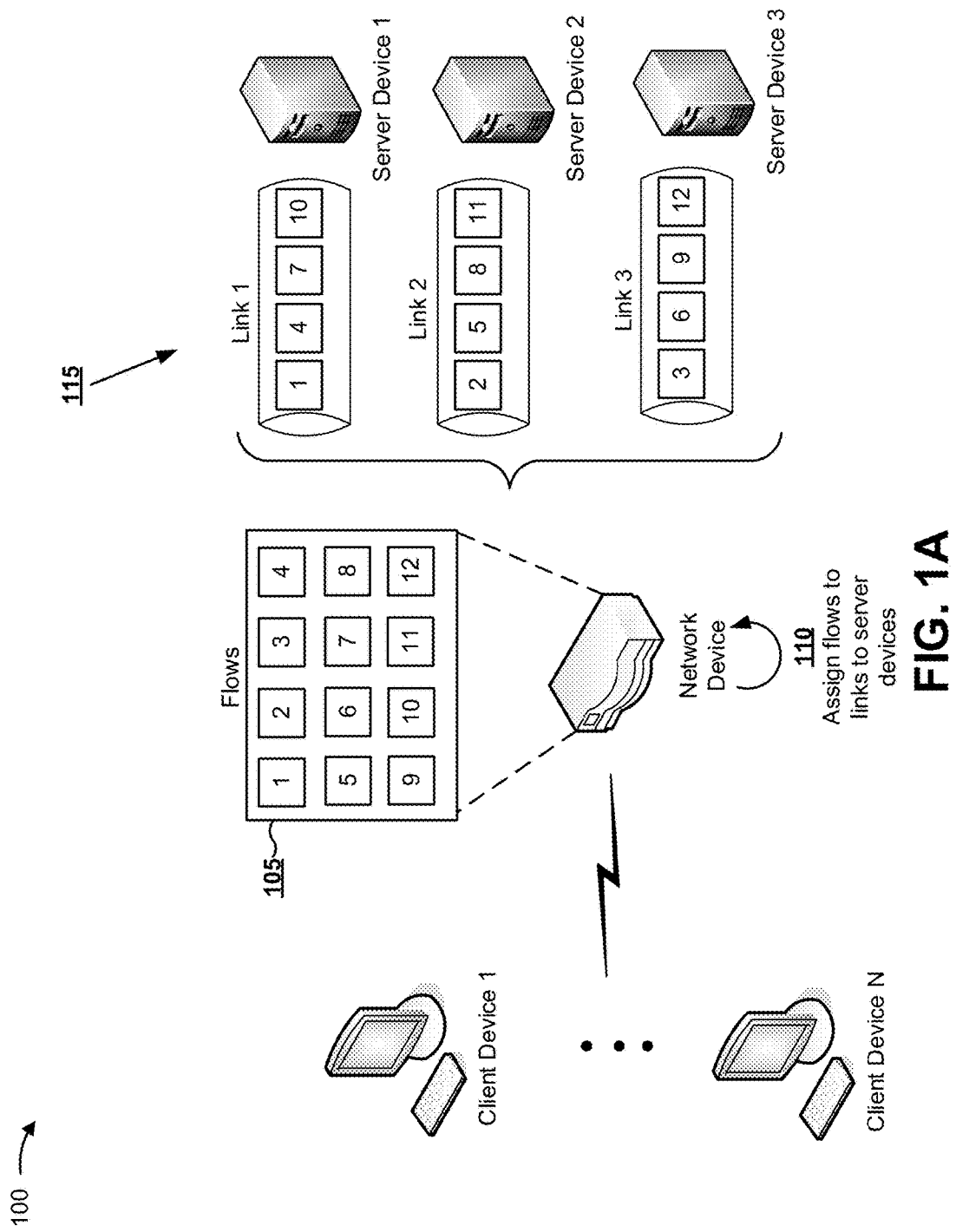
FIGS. 1A-1C are diagrams of an overview of an example implementation described herein.
Figure 1B:
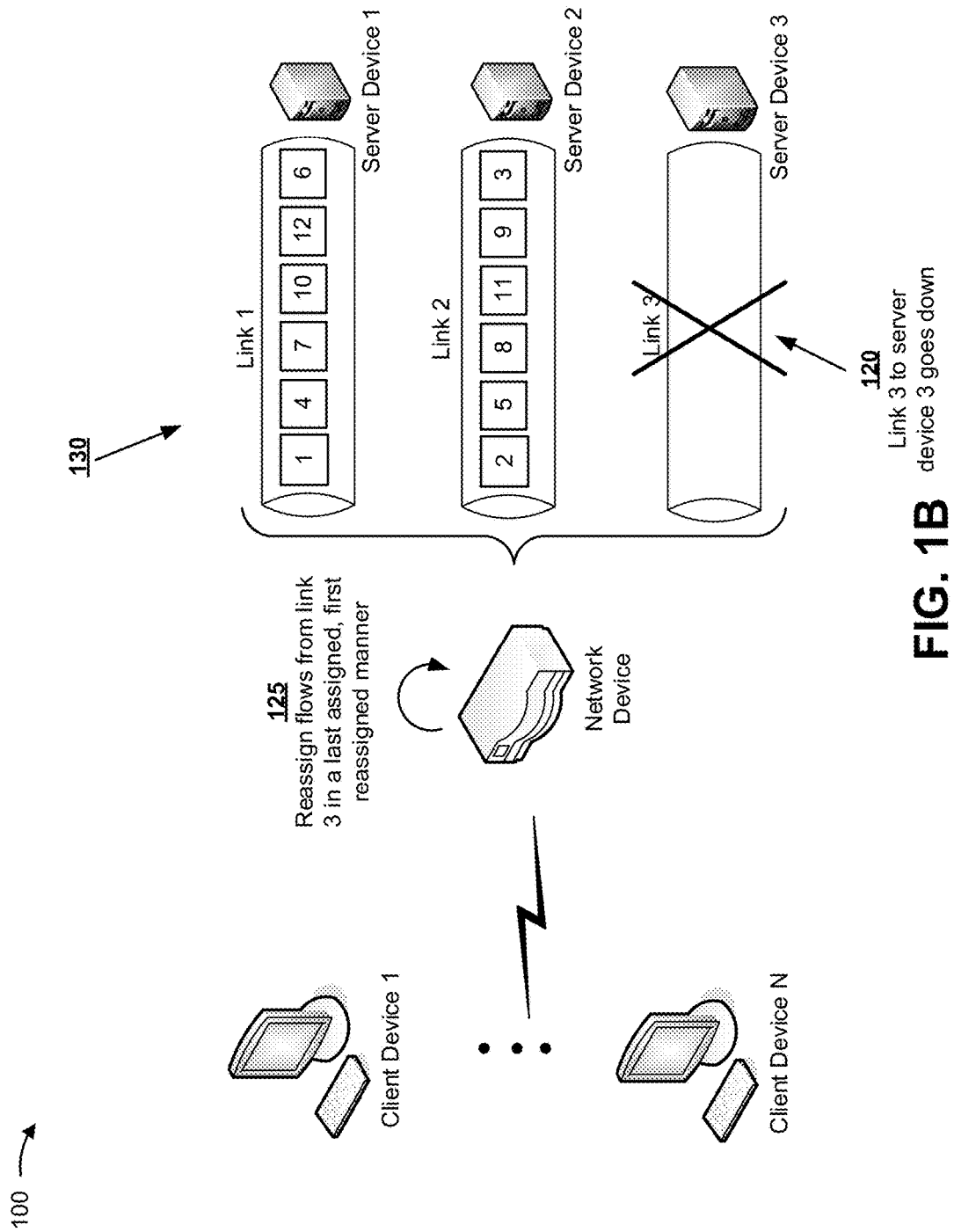
Figure 1C:
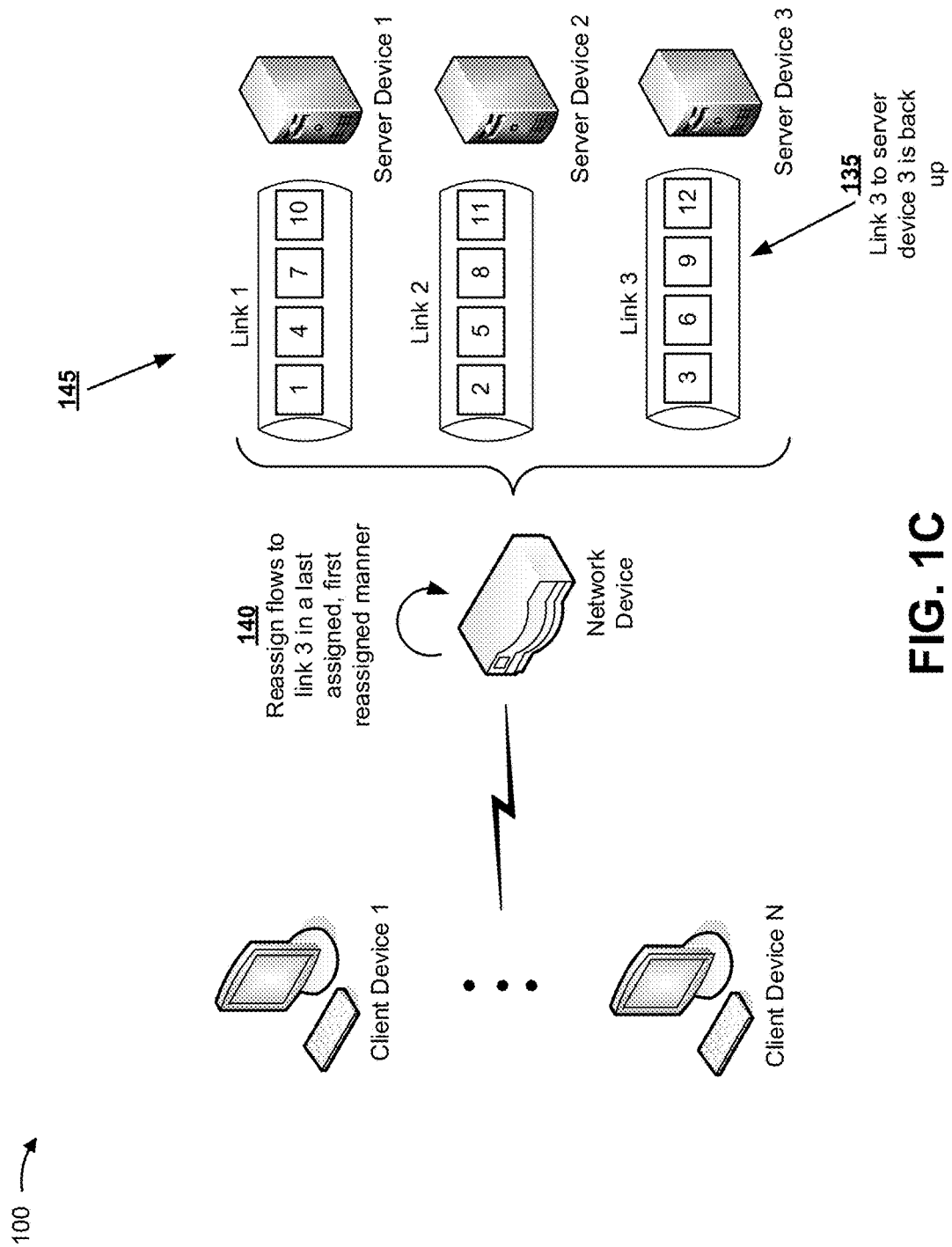

FIGS. 1A-1C are diagrams of an overview of an example implementation 100 described herein. As shown in FIG. 1A, example implementation 100 may include one or more client devices (e.g., client devices 1 through N), a network device, one or more server devices (e.g., server devices 1 through 3), and links between the network device and the server devices (e.g., link 1 to server device 1, link 2 to server device 2, and link 3 to server device 3).

As shown by reference number 105, the network device may have information identifying multiple flows (e.g., flow 1 through flow 12) from client devices 1 through N. The network device may have the information so as to assign the flows to server devices 1 through 3. As shown by reference number 110, the network device may assign the flows to the links to the server devices (or virtual devices implemented on the server devices). In this case, the network device may use a stack data structure (e.g., that tracks an order of assignment of flows) to store information identifying which flows are assigned to which links. For example, the network device may use a first data structure to store information identifying the flows assigned to link 1, a second data structure to store information identifying the flows assigned to link 2, and so on.

As shown by reference number 115, the network device may assign the flows to the links in a particular order. For example, the network device may assign flow 1 to link 1, flow 2 to link 2, and flow 3 to link 3, and so on. As further shown by reference number 115, the network device may assign the flows to the links in a round-robin manner. For example, after assigning flow 3 to link 3, the network device may assign flow 4 to link 1, flow 5 to link 2, flow 6 to link 3, flow 7 to link 1, flow 8 to link 2, and so on. In this way, the network device may assign a balanced (e.g., equal or near equal) quantity of flows to the links.

In some implementations, the network device may assign the flows in a weighted round-robin manner, or another manner other than round-robin. For example, the network device may assign the flows based on different weights assigned to each of the flows (e.g., rather than treating each flow equally). The weights assigned to each flow may be based on an amount of processing power required to handle each of the flows, an amount of bandwidth required for each of the flows, a processing capability and/or capacity of each of the server devices, a location of each of the server devices (e.g., relative to the network device and/or a client device), server load (e.g., which may differ based on quantities of flows assigned to each server device or whether the server devices can receive traffic other than the flows), and/or the like. When assigning flows in a weighted round-robin manner, the network device may balance the flows such that the weights of the flows, rather than the quantity of flows, are balanced across the server devices.

The network device may store information in the stack data structure that indicates the order in which flows have been assigned to each link. For example, the network device may store information in the stack data structure that indicates the order in which flows have been assigned to each link, as further shown by reference number 115. Continuing with the previous example, for link 1, the information in the stack data structure may indicate that flow 1 was assigned before flow 4, which was assigned before flow 7, which was assigned before flow 10. The network device may store similar information for links 2 and 3. In this way, the network device may determine which flow was the last assigned flow for each link.

As shown in FIG. 1B, and by reference number 120, a link (e.g., link 3 to server device 3) may become unavailable to handle flows between the network device and server device 3. For example, link 3 may go down, server device 3 may be taken offline, a threshold amount of congestion/traffic may be present on link 3, and/or the like. In this case, as shown by reference number 125, the network device may reassign flows from link 3 to the other links in a last assigned, first reassigned manner. For example, the network device may first reassign the last flow assigned to link 3 (e.g., flow 12). In this case, the network device may reassign the flow to link 1 first based on storing information identifying link 1 as the next link to receive a flow in a round-robin manner based on link 3 being the last link to receive a flow when the flows were initially assigned with respect to reference numbers 110 and 115 in FIG. 1A.

In some implementations, reassigning the flows in a last assigned, first reassigned manner may increase flow consistency, reduce a quantity of flows that need to be reassigned when a server device is added to, or removed from a network (e.g., relative to using a modulo operation to reassign flows), and/or the like. For example, using a modulo operation to reassign flows may cause rearrangement of more than a minimum quantity of flows needed to balance the flows, thereby increasing inefficiency. In addition, using a modulo operation may cause a particular flow to be reassigned to several different server devices, thereby decreasing flow consistency. Further, using a modulo operation may result in an unbalanced quantity of flows being assigned to server devices, or server devices that do not have a near equal quantity of flows (e.g., where the quantity of flows assigned to each server device is within one).

As shown by reference number 130, the network device may continue to reassign flows to link 1 and link 2 in a round-robin manner, until all flows from link 3 have been reassigned to links 1 and 2. For example, the network device may assign flow 12 to link 1, flow 9 to link 2, flow 6 to link 1, and flow 3 to link 2. In this way, the network device maintains a balanced (e.g., equal or near equal) quantity of flows. In some implementations, the network device may assign the flows based on a weighted round-robin, or another manner, as described elsewhere herein. In this case, the network device may store information identifying link 2 as the last link assigned a flow.

As further shown by reference number 130, the flows originally assigned to link 1 have remained assigned to link 1 (e.g., flows 1, 4, 7, and 10), and the flows originally assigned to link 2 have remained assigned to link 2 (e.g., flows 2, 5, 8, and 11). In this way, the network device minimizes a quantity of reassigned flows and minimizes a quantity of disrupted flows due to reassignment. For example, if flows were reassigned using a modulo operation, the network device may reassign more flows than just the flows from removed server device 3. This conserves processing resources of the network device and/or minimizes interruptions to server device processing of client services. In addition, this conserves network resources that would be used to reassign the flows. In addition, this minimizes disruptions to the flows, thereby improving communications among the client devices, the network device, and the server devices.

As shown in FIG. 1C, and by reference number 135, link 3 to server 3 may become available. For example, link 3 may come back up, or server device 3 may be brought back online. As shown by reference number 140, the network device may reassign flows to link 3 in a last assigned, first reassigned manner. For example, the network device may first assign, to link 3, the last flow assigned (e.g., flow 3, which was last flow assigned based on being reassigned from link 3 to link 2).

As shown by reference number 145, the network device may continue to reassign flows to link 3 from link 1 and link 2 in a round-robin manner, until each link has a balanced (e.g., equal or near equal) quantity of flows. In some implementations, the network device may continue to reassign flows until each server device has an equal, or near equal, weight of flows. In this way, the network device continues to maintain a balanced quantity of flows to the links. Furthermore, as shown by reference number 145, the network device has assigned the flows to the same links, and in the same order, as originally assigned in FIG. 1A, thereby minimizing disruption to the flows.

In this way, implementations described herein minimize a quantity of flows that are reassigned when a server device is added to, or removed from a network, thereby conserving processing resources. Furthermore, implementations described herein more evenly distribute flows relative to hash-based load balancing, thereby conserving processing resources of the server devices. Furthermore, implementations described herein increase an efficiency of rebalancing flows when a server is added to or removed from a network by reducing a quantity of flows to rebalance, and/or by reducing an amount of time needed for rebalancing.

As indicated above, FIGS. 1A-1C are provided merely as an example. Other examples are possible and may differ from what was described with regard to FIGS. 1A-1C. For example, although implementations shown in FIGS. 1A-1C are described with respect to round-robin assignment and/or reassignment, other examples may include different manners of assignment and/or reassignment, as described elsewhere herein. As another example, although FIGS. 1A-1C show three links, other examples may include tens of links, hundreds of links, thousands of links, etc.

Figure 2:
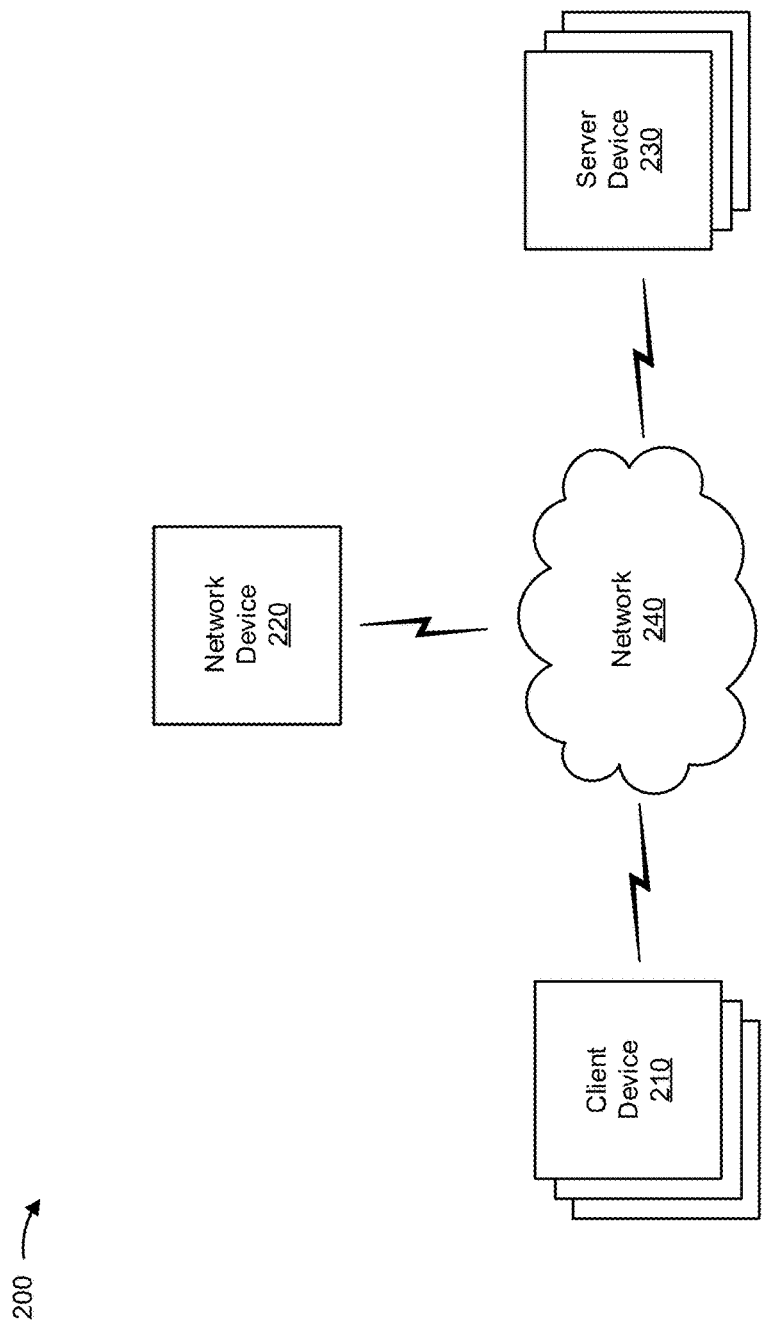
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of client devices 210 (referred to collectively as "client devices 210" and individually as "client device 210"), a network device 220, and a set of server devices 230 (referred to collectively as "server devices 230" and individually as "server device 230"). Devices of environment 200 may interconnect via wired connections, wireless connections, or a combination of wired and wireless connections.

Client device 210 includes one or more devices capable of receiving, generating, storing, processing, and/or providing information associated with a flow between client device 210 and server device 230. For example, client device 210 may include a communication and/or computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), an automated teller machine (ATM), an Internet of things (IoT) device, a controller of client device 210, or a similar type of device. In some implementations, client device 210 may provide a flow to network device 220 destined for server device 230, as described elsewhere herein. Additionally, or alternatively, client device 210 may receive a flow of data from server device 230, as described elsewhere herein.

Network device 220 includes one or more devices (e.g., one or more traffic transfer devices) capable of receiving, storing, generating, processing, and/or providing information related to a flow between client device 210 and server device 230. For example, network device 220 may include a firewall, a router, a gateway, a switch, a hub, a bridge, a reverse proxy, a server (e.g., a proxy server), a security device, an intrusion detection device, a load balancer, a multiplexer (mux), a demultiplexer (demux), device communication equipment, data communications equipment, an Internet exchange, a data center, a service provider, network transport technology/device, or a similar device. In some implementations, network device 220 may assign multiple flows to multiple server devices 230, as described herein. Additionally, or alternatively, network device 220 may reassign the multiple flows as server devices 230 become available or unavailable, as described elsewhere herein.

Server device 230 includes one or more devices capable of receiving, storing, generating, processing, and/or providing information associated with a flow between client device 210 and server device 230. For example, server device 230 may include a server (e.g., in a data center, a server farm, or a cloud computing environment), a data center (e.g., a multi-server micro data center), a workstation computer, a virtual machine (VM) provided in a cloud computing environment, a rack with one or more server devices 230, or a similar type of device or devices. In some implementations, server device 230 may receive one or more flows from network device 220 via a link between network device 220 and server device 230, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a Clos network, a content delivery network, a distributed or clustered network/system (e.g., for which Hadoop may be used), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
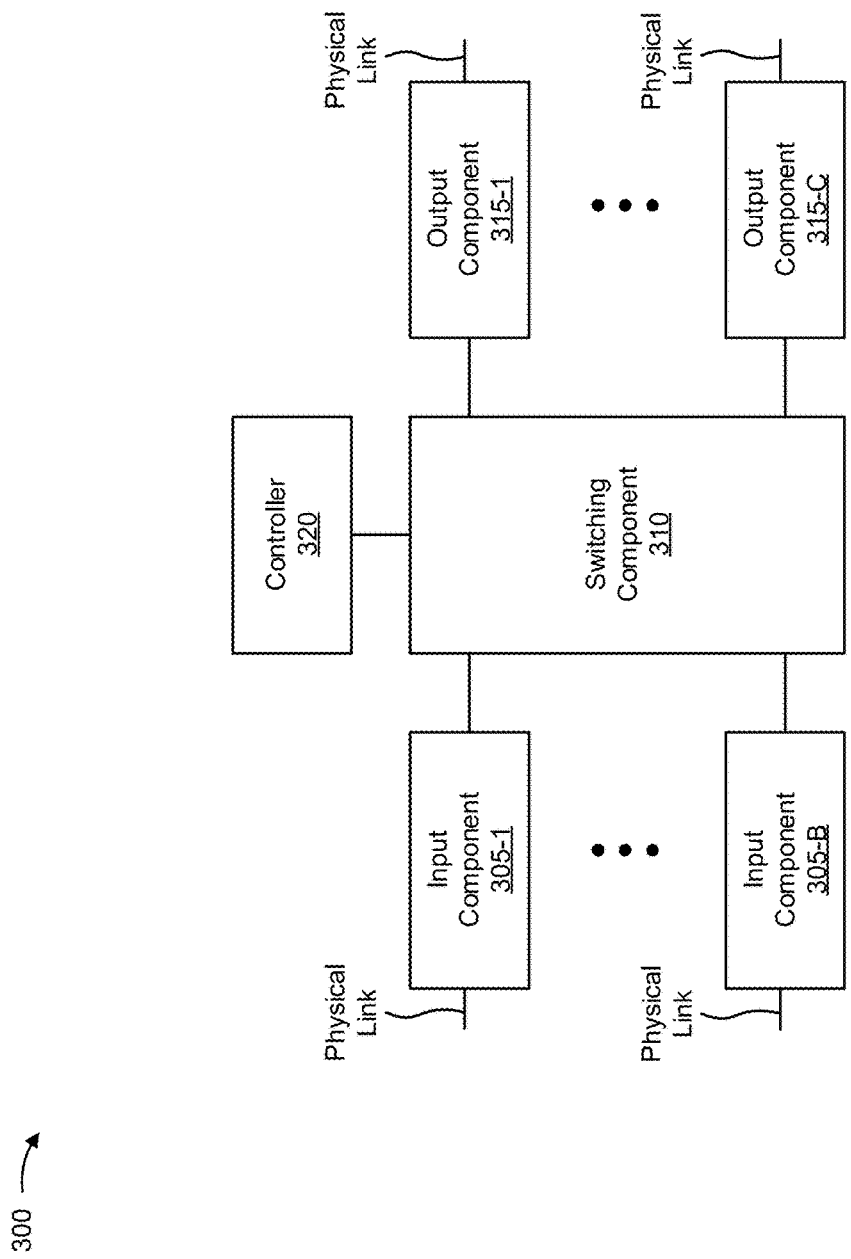
FIG. 3 is a diagram of example components of one or more devices of FIG. 2.

FIG. 3 is a diagram of example components of a device 300. Device 300 may correspond to client device 210, network device 220, and/or server device 230. In some implementations, client device 210, network device 220, and/or server device 230 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
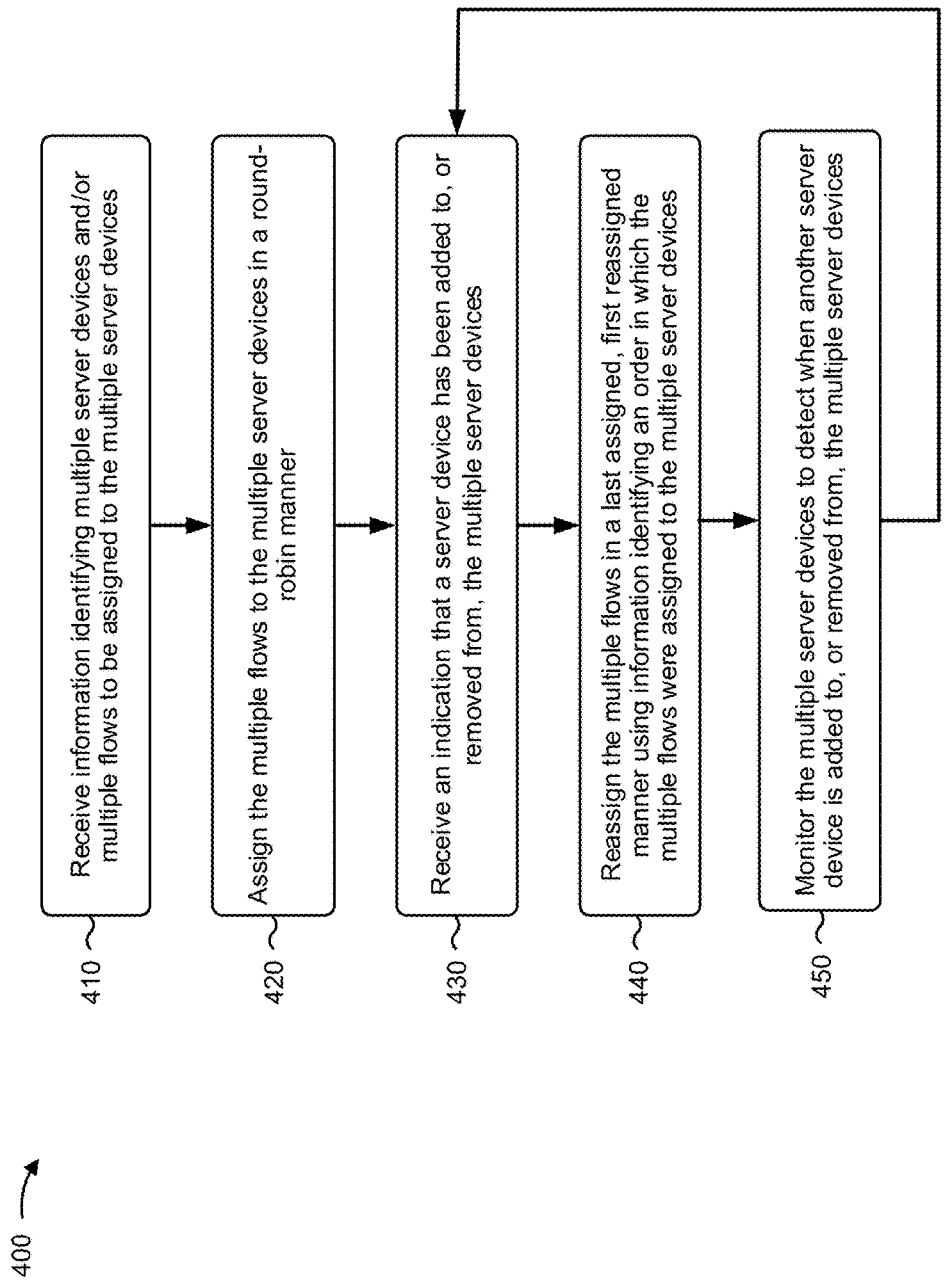
FIG. 4 is a flow chart of an example process for consistent flow assignment in load balancing.

FIG. 4 is a flow chart of an example process 400 for consistent flow assignment in load balancing. In some implementations, one or more process blocks of FIG. 4 may be performed by network device 220. In some implementations, one or more process blocks of FIG. 4 may be performed by another device or a group of devices separate from or including network device 220, such as client device 210 and server device 230.

As shown in FIG. 4, process 400 may include receiving information identifying multiple server devices and/or multiple flows to be assigned to the multiple server devices (block 410). For example, network device 220 may receive information identifying multiple server devices 230 and/or multiple flows to be assigned to the multiple server devices 230.

In some implementations, network device 220 may receive the information from client device 210 and/or server device 230. In some implementations, network device 220 may receive the information periodically, according to a schedule, based on requesting the information, and/or the like. In some implementations, the information may identify a link between network device 220 and server device 230 (e.g., rather than identifying server device 230). Additionally, or alternatively, the information may identify a virtual machine implemented on server device 230. In some implementations, the term link may refer to a connection, a path, a tunnel, a transport method, an inter-process communication mechanism, a channel, and/or the like.

In some implementations, a flow, of the multiple flows, may include a flow of data, a flow of requests for data, a flow of requests for processing resources or certain processing of data, a job, a critical job, a mission control job, a service, a portion of a job (e.g., being reassigned due to the job taking a threshold amount of time to complete), and/or the like from client device 210 to server device 230. In some implementations, a flow may represent a group of packets with the same tuple of packet fields. In some implementations, a flow may represent a set of flows, such as a set of flows that share the same hash result, or portion of a hash result, calculated from a hash input formed by a tuple of packet fields.

In some implementations, network device 220 may use a data structure that corresponds to a respective server device 230 (or link to server device 230) to store information associated with the respective server device 230. In some implementations, network device 220 may use a stack data structure to store information identifying which flows are assigned to each server device 230 and the order in which the flows are assigned. This permits network device 220 to determine which flows are assigned to each server device 230 and the order in which the flows were assigned. In addition, using a stack data structure permits network device 220 to quickly and efficiently determine an order in which the flows were assigned to each server device 230, thereby conserving processing resources.

In some implementations, network device 220 may use a linked list or a double linked list to store information identifying the multiple server devices 230. In some implementations, network device 220 may use the linked list to identify a particular server device 230 to which to assign, or reassign, a flow. For example, when network device 220 is assigning or reassigning flows, network device 220 may iterate through the linked list to identify the particular server devices 230 to which to assign, or re-assign, the flows and an order in which the particular server devices 230 are to be assigned the flows. In some implementations, when assigning the flows, network device 220 may iterate through the list in a particular manner (e.g., alphabetical order or numerical order based on identifiers for the multiple server devices 230). Additionally, or alternatively, when reassigning the flows, network device 220 may iterate through the list in another manner (e.g., reverse alphabetical order, reverse numerical order, iterate through the linked list in a direction opposite of that during assignment, etc.).

In this way, network device 220 may receive information identifying multiple server devices 230 and/or multiple flows.

As further shown in FIG. 4, process 400 may include assigning the multiple flows to the multiple server devices in a round-robin manner (block 420). For example, network device 220 may assign the multiple flows to multiple server devices 230.

In some implementations, network device 220 may assign the multiple flows in a particular manner. For example, network device 220 may assign the multiple flows in a round-robin manner, a weighted round-robin manner, or another manner. As a particular example, network device 220 may assign a first flow to a first server device 230, a second flow to a second server device 230, and so on until a flow has been assigned to each server device 230, and may then assign the next flow to the first server device 230, the next flow after that to the second server device 230, and so on. In this way, network device 220 may balance flows among multiple server devices 230 such that each of the server devices 230 has been assigned an equal, or near equal, quantity of flows. This conserves processing resources of the multiple server devices 230 and reduces network congestion associated with any particular server device 230.

Additionally, or alternatively, network device 220 may assign the multiple flows in another manner. For example, network device 220 may assign the flows in a weighted round-robin manner. In some implementations, the weight may be based on an amount of processing power required to handle each of the flows, an amount of bandwidth required for each of the flows, a processing capability of each server device 230 in a set of server devices 230, a location of each server device 230 in a set of server devices 230 (e.g., relative to network device 220 and/or client device 210), server load (e.g., which may differ based on quantities of flows assigned to each server device 230 in a set of server devices 230 or whether a particular server device 230 can receive traffic other than the flows), and/or the like.

In some implementations, when assigning flows in a weighted round-robin manner, network device 220 may assign flows so that weights are balanced across server devices 230 (e.g., rather than balancing the quantity of flows assigned to each server device 230). For example, assuming that two flows each have a weight of 1.0 and a third flow has a weight of 2.0, network device 220 may assign the two flows with the 1.0 weight to a first server device 230 and may assign the flow with the 2.0 weight to a second server device 230 so that the total weight of flows assigned to each of the first and second server devices 230 is 2.0. In this way, network device 220 may balance flows based on factors other than a quantity of flows.

In some implementations, when assigning flows in a weighted round-robin manner, network device 220 may specify a different weight factor for each of the server devices 230 (e.g., rather than balancing the quantity of flows assigned to each server device 230). For example, assume that a first server device 230 is assigned a weight factor of 4.0 (since a connecting link bandwidth of the first server device 230 is 40 gigabits per second (gbps)) and that a second server device 230 is assigned a weight factor of 1.0 (since a connecting link bandwidth of the second server device 230 is 10 gbps). In this case, a linked list may contain four entries for the first server device 230 and one entry for the second server device 230, hence four flows will be assigned to the first server device 230 for each flow assigned to the second server device 230.

In some implementations, network device 220 may store information identifying the flows and the particular server devices 230 to which the flows were assigned. For example, network device 220 may store the information in the data structure. In some implementations, network device 220 may store the information in a stacked manner (e.g., when the data structure is a stack data structure that stores information in an order in which the information is added to the stack data structure). For example, network device 220 may store the information such that insertion or deletion of the information occurs at a particular end of the data structure.

In some implementations, network device 220 may determine that the last information stored in the data structure corresponds to the last flow assigned to server device 230. For example, when network device 220 stores information identifying a flow at an end of the data structure associated with server device 230, network device 220 may identify the flow as the last flow assigned to server device 230. In this way, network device 220 may quickly and efficiently identify the last flow assigned to a particular server device 230 and may identify the first flow to be reassigned in the event the particular server device 230 goes down or otherwise becomes unavailable.

In some implementations, network device 220 may store information identifying an order in which the multiple flows were assigned to the multiple server devices. For example, network device 220 may store information identifying that a first flow was assigned to a first server device 230 before a second flow was assigned to the first server device 230. In some implementations, this may be indicated by the manner in which the information was stored in a data structure associated with the first server device 230, as described above. This permits network device 220 to determine an order in which flows were assigned to a particular server device 230 in an efficient manner.

Additionally, or alternatively, network device 220 may store information identifying which server device 230 was the last server device 230 to which network device 220 assigned a flow. For example, network device 220 may store information identifying a first server device 230 as the last server device 230 to be assigned a flow, a second server device 230 as having been assigned a flow before the first server device 230, a third server device 230 as having been assigned a flow before the second server device 230, and so on. This permits network device 220 to identify an order in which the flows were assigned to various server devices 230, so as to quickly and efficiently identify the next server device 230 to which to assign a flow.

In this way, network device 220 may assign the multiple flows to the multiple server devices 230 in a round-robin manner. In some implementations, network device 220 may assign the multiple flows in another manner, such as weighted round-robin, round-robin domain name server (DNS), DNS delegation, randomly, based on user input, and/or the like.

As further shown in FIG. 4, process 400 may include receiving an indication that a server device has been added to, or removed from, the multiple server devices (block 430). For example, network device 220 may receive an indication that a particular server device 230 has been added to, or removed from, the multiple server devices 230 (e.g., due to server device 230 or a link between network device 220 and server device 230 coming up/going down, becoming available/unavailable, etc.). In some implementations, network device 220 may receive the indication based on monitoring server device 230 and/or a link between network device 220 and server device 230. Additionally, or alternatively, network device 220 may receive the indication from a particular server device 230 (e.g., when the particular server device 230 becomes available), or from another server device 230 (e.g., when the particular server device 230 goes down).

In some implementations, network device 220 may receive an indication that a particular server device 230 has been added to the multiple server devices 230. For example, network device 220 may receive the indication when network device 220 detects that a link has an up status, that a link has become available, that server device 230 has an up status, that server device 230 has become available, and/or the like.

Additionally, or alternatively, network device 220 may receive an indication that a particular server device 230 has been removed from the multiple server devices 230. For example, network device 220 may receive the indication when network device 220 detects that a link has gone down, that a link has become unavailable, that server device 230 has gone down, that server device 230 has become unavailable, and/or the like.

In this way, network device 220 may receive an indication that a particular server device 230 has been added to, or removed from, the multiple server devices 230.

As further shown in FIG. 4, process 400 may include reassigning the multiple flows in a last assigned, first reassigned manner using information identifying an order in which the multiple flows were assigned to the multiple server devices (block 440). For example, network device 220 may reassign the flows in a last assigned, first reassigned manner. In some implementations, network device 220 may reassign the flows using information identifying an order in which the multiple flows were assigned to the multiple server devices 230.

In some implementations, when a particular server device 230 is added to the multiple server devices 230, network device 220 may reassign flows from other sever devices 230 to the particular server device 230. For example, network device 220 may reassign flows from the other server devices 230 to the added server device 230 in a last assigned, first reassigned manner. In this case, network device 220 may reassign a first flow before reassigning a second flow when the first flow was assigned to server device 230 subsequent to the second flow. In some implementations, network device 220 may use information identifying the last server device 230 to be assigned a flow to identify the first server device 230 from which to reassign a flow. For example, assuming that a particular server device 230 was the last server device 230 to be assigned a flow, network device 220 may determine to reassign a flow from server device 230 before reassigning a flow from another server device 230 using information identifying the particular server device 230 as the last server device 230 to be assigned a flow. This facilitates flow assignment consistency via ordered reassignment of the flows, thereby minimizing interruptions to communications.

In some implementations, when reassigning flows, network device 220 may determine which flow to next reassign. In some implementations, network device 220 may determine which flow to next reassign using the stack data structure. For example, network device 220 may identify the next flow to reassign by identifying the last flow assigned where the last entry in a stack data structure identifies the last flow assigned. In this way, when network device 220 is reassigning flows from each of the multiple server devices 230, network device 220 may identify a flow to reassign by identifying the last assigned flow.

In some implementations, network device 220 may reassign the flows in a round-robin manner, or another manner as described elsewhere herein. For example, in a case where network device 220 reassigns flows to a first server device 230 from a second server device 230 and a third server device 230 when the first server device 230 is added to the multiple server devices 230, network device 220 may reassign a last assigned flow from the second server device 230 to the first server device 230, reassign a next-to-last assigned flow from the third server device 230 to the first server device 230, reassign the flow assigned after the next-to-last assigned flow to the first server device 230, and so on.

In some implementations, network device 220 may continue to reassign flows until each server device 230 has been reassigned an equal, or near equal, quantity of flows, such as when reassigning flows in a round-robin manner. Additionally, or alternatively, network device 220 may reassign flows until each server device 230 has been reassigned an equal weight of flows, such as when network device 220 is reassigning flows based on weights associated with the flows. In this way, network device 220 may reassign flows in a round-robin manner when a particular server device 230 is added to the multiple server devices 230. This minimizes a quantity of flows that are reassigned, thereby conserving processing resources, minimizing disruption to the flows between network device 220 and server devices 230, and increasing consistency of assignment of the flows (e.g., by minimizing reassignment of flows originally assigned to server devices 230 relative to using a modulo operation, which may cause network device 220 to reassign flows as though the reassignment were a new assignment).

In some implementations, network device 220 may determine a quantity of flows to reassign when a new server device 230 is added to the multiple server devices 230. For example, network device 220 may use an equation or formula, such as:

$$Q=L/(M+1) \qquad (1)$$

In equation 1, the term Q may represent the quantity of flows to reassign, the term L may represent a total quantity of flows between network device 220 and the multiple server devices 230, and the term M+1 may represent a total quantity of server devices 230 included in the multiple server devices 230, including the added server device 230 (e.g., represented by 1). In some implementations, network device 220 may use equation 1 to determine a quantity of flows to reassign to an added server device 230. For example, assume that the multiple server devices 230 include three server devices 230 and that an additional server device 230 is added to the multiple server devices 230. Further assume for example, that there are 12 flows between network device 220 and the multiple server devices 230. In this case, network device 220 may determine that three flows are to be reassigned to the added server device 230 (e.g., based on a result of equation 1, where 12/(3+1) equals three).

In some implementations, when a particular server device 230 is removed from the multiple server devices 230, network device 220 may reassign flows from the particular server device 230 to other server devices 230. For example, network device 220 may reassign flows from the removed server device 230 to the other server devices 230 in a last assigned, first reassigned manner.

In some implementations, network device 220 may use information identifying the last server device 230 to be assigned a flow to identify to which server device 230 to reassign a flow. For example, network device 220 may use information identifying a first server device 230 as the last server device 230 to be assigned a flow to determine to reassign a flow to a second server device 230 (e.g., based on the second server device 230 being the next server device 230 to be assigned a flow after the first server device 230).

In some implementations, when reassigning flows, network device 220 may determine which flow to reassign (e.g., which flow to reassign next). In some implementations, network device 220 may determine which flow to reassign using the stack data structure (e.g., where the last entry in the stack data structure identifies the last flow assigned, and thereby the next flow to reassign). In some implementations, network device 220 may identify the last flow assigned as the next flow to reassign. In this way, when network device 220 is reassigning flows from the removed server device 230, network device 220 may reassign the flows starting with the last assigned flow (e.g., in a last assigned, first reassigned manner).

In some implementations, network device 220 may reassign the flows in a round-robin manner, or another manner. For example, assuming that a first server device 230 has been removed from the multiple server devices 230, network device 220 may reassign a last assigned flow from the first server device 230 to a second server device 230, reassign a next-to-last assigned flow from the first server device 230 to a third server device 230, and so on until the flows from the first server device 230 have been reassigned.

In some implementations, network device 220 may reassign the flows in a round-robin manner, or another manner, that reassigns the flows in the opposite manner from which the flows were assigned to each server device 230. For example, if flows were assigned to a first server device 230 before a second server device 230, which was assigned flows before a third server device 230, then flows assigned to the third server device 230 may be reassigned to the second server device 230 before being reassigned to the first server device 230. In this way, network device 220 may maintain the order of assignment of the flows if the third server device 230 is later added back to the multiple server devices 230.

In some implementations, network device 220 may determine an order in which to reassign the flows to the server devices 230 using a linked list. For example, the linked list may identify the server devices 230 to which the flows are to be reassigned.

In some implementations, when a first server device 230 is added to the multiple server devices 230 and a second server device 230 is removed from the multiple server devices 230 at the same time, network device 220 may first reassign flows from the second (removed) server device 230 to the remaining server devices 230 prior to reassigning flows to the added server device 230. In some implementations, network device 220 may then reassign flows from the remaining server devices 230 to the added server device 230. In other words, network device 220 may prioritize reassignments relating to removal of server devices 230 over reassignments relating to additions of server devices 230. In this way, network device 220 minimizes a quantity of flows reassigned due to adding and removing server devices 230 at the same time.

In some implementations, network device 220 may reassign flows in a first assigned, first reassigned manner (e.g., rather than in a last assigned, first reassigned manner, as described above). For example, assuming that a first flow was the first flow to be assigned to a first server device 230, network device 220 may reassign the first flow before reassigning a second flow assigned to the first server device 230. In some implementations, network device 220 may reassign the flows in a first assigned, first reassigned manner in a particular context. For example, network device 220 may reassign the flows in a first assigned, first reassigned manner in a video streaming context, where multiple failures on a single client device 210 may be less tolerable relative to some other types of contexts.

In this way, network device 220 may reassign multiple flows in a last assigned, first reassigned manner using information identifying an order in which the multiple flows were assigned to the multiple server devices 230.

As further shown in FIG. 4, process 400 may include monitoring the multiple server devices to detect when another server device is added to, or removed from, the multiple server devices (block 450). For example, network device 220 may monitor multiple server devices 230 to detect when a particular server device 230 is added to, or removed from, the multiple server devices 230. In some implementations, network device 220 may monitor the multiple server devices 230 in a manner similar to that described above. In some implementations, network device 220 may receive an indication that a particular server device 230 has been added to, or removed from, the multiple server devices 230 and/or may reassign the multiple flows when monitoring the multiple server devices 230. In other words, process 500 may include returning to block 430 and/or block 440.

In some implementations, network device 220 may provide traffic associated with the flows to, or receive traffic from, the multiple server devices 230 while monitoring the multiple server devices 230. In some implementations, network device 220 may provide or receive the traffic via the links between network device 220 and the multiple server devices 230.

In some implementations, network device 220 may perform an action other than monitoring the multiple server devices 230. In some implementations, network device 220 may generate a report or send a message to another device that identifies which flows are assigned to which server devices 230, which server devices 230 are up/down or available/unavailable, and/or the like. Additionally, or alternatively, network device 220 may send a message to client device 210 to notify a user of client device 210 that service may be interrupted while network device 220 reassigns flows. Additionally, or alternatively, network device 220 may send a message to a device of a network administrator to inform the network administrator that a particular server device 230 has gone down or become unavailable.

In this way, network device 220 may monitor the multiple server devices to detect when a particular server device 230 is added to, or removed from, the multiple server devices 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may assign flows to server devices in a round-robin manner, or another manner. In addition, the implementations may use a stack data structure for each server device to store information identifying the flows assigned to each server device. Further, the implementations may reassign the flows from one server device to another server device in a last assigned, first reassigned manner using the stack data structure.

In this way, implementations described herein minimize a quantity of flows that are reassigned when a server device is added to or removed from a network, thereby conserving processing resources. Furthermore, implementations described herein more evenly distribute flows relative to hash-based load balancing, thereby conserving processing resources of the server devices. Furthermore, implementations described herein increase an efficiency of rebalancing flows when a server device is added to, or removed from, a network by reducing a quantity of flows to rebalance, and/or by reducing an amount of time needed for rebalancing.

Although implementations are described with respect to round-robin assignment and/or reassignment, other implementations may include different manners of assignment and/or reassignment, as described elsewhere herein.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
  receive first information identifying multiple server devices and second information identifying multiple flows,
   the multiple flows to be assigned to the multiple server devices;
  assign the multiple flows to the multiple server devices in a first manner based on receiving the first information and the second information and without using a modulo operation;
  store the second information in multiple data structures to record assignment of the multiple flows to the multiple server devices based on assigning the multiple flows to the multiple server devices, a data structure, of the multiple data structures, corresponding to a respective server device of the multiple server devices;

receive an indication that a first server device has been added to, or removed from, the multiple server devices after storing the second information,
the indication being received based on monitoring a link between the device and one of the multiple server devices; and reassign, based on receiving the indication, a subset of the multiple flows in a second manner using third information identifying an order in which the multiple flows were assigned to the multiple server devices,
the second manner being different from the first manner, and
the second manner including a first assigned, first reassigned order.

2. The device of claim 1, where the one or more processors are further to:
perform an action after reassigning the subset of the multiple flows,
the action including sending a message that identifies the reassignment of the subset of the multiple flows to or from the multiple server devices.

3. The device of claim 1, where the one or more processors, when assigning the multiple flows, are to:
assign a first flow, of the multiple flows, to a second server device, of the multiple server devices, using a linked list,
the linked list identifying the second server device as a first entry in the linked list;
assign a second flow, of the multiple flows, to a third server device, of the multiple server devices, after assigning the first flow,
the linked list identifying the third server device as a second entry in the linked list; and
assign a third flow to the second server device after assigning a fourth flow to a fourth server device,
the linked list identifying the fourth server device as a last entry in the linked list.

4. The device of claim 1, where the one or more processors are further to:
determine a quantity of flows to reassign based on receiving the indication; and
where the one or more processors, when reassigning the subset of the multiples flows, are to:
reassign the subset of the multiple flows based on determining the quantity of flows to reassign.

5. The device of claim 1, where the one or more processors, when assigning the multiple flows, are to:
assign the multiple flows to multiple links between the device and the multiple server devices based on receiving the first information and the second information, or
assign the multiple flows to multiple virtual devices implemented on the multiple server devices based on receiving the first information and the second information.

6. The device of claim 1, where the one or more processors are further to:
determine the third information using information identifying a last server device, of the multiple server devices, to be assigned a flow, of the multiple flows, based on receiving the indication, or
determine the third information using the data structure based on receiving the indication; and where the one or more processors, when reassigning the subset of the multiple flows, are to:
reassign the subset of the multiple flows based on determining the third information.

7. The device of claim 1, wherein the first manner is a weighted round-robin manner.

8. A non-transitory computer-readable medium storing instructions, the instructions comprising:
one or more instructions that, when executed by one or more processors, cause the one or more processors to:
receive first information identifying a plurality of server devices and second information identifying a plurality of flows destined for the plurality of server devices, the plurality of flows to be assigned to the plurality of server devices or a plurality of links between a network device and the plurality of server devices;
assign the plurality of flows to the plurality of server devices in a first manner based on receiving the first information and the second information;
store the second information in a plurality of data structures to record assignment of the plurality of flows to the plurality of server devices based on assigning the plurality of flows to the plurality of server devices, a data structure, of the plurality of data structures, corresponding to a respective server device of the plurality of server devices;
receive an indication that a first server device has been added to, or removed from, the plurality of server devices after storing the second information, the indication being received based on monitoring a link, of the plurality of links, between the network device and one of the plurality of server devices; and
reassign a subset of the plurality of flows in a second manner using third information identifying an order in which the plurality of flows were assigned to the plurality of server devices based on receiving the indication, the second manner being different from the first manner, and the second manner including a first assigned, first reassigned order.

9. The non-transitory computer-readable medium of claim 8, where the one or more instructions, that cause the one or more processors to receive the indication, cause the one or more processors to:
receive the indication that the first server device has been added to the plurality of server devices after storing the second information; and
where the one or more instructions, when executed by the one or more processors, further cause the one or more processors to:
determine a quantity of flows, corresponding to the subset of the plurality of flows, to reassign to the first server device based on receiving the indication.

10. The non-transitory computer-readable medium of claim 8, where the one or more instructions, that cause the one or more processors to receive the indication, cause the one or more processors to:
receive the indication that the first server device has been removed from the plurality of server devices after storing the second information; and
where the one or more instructions, when executed by the one or more processors, further cause the one or more processors to:
determine a quantity of flows, corresponding to the subset of the plurality of flows, to reassign to remaining server devices, of the plurality of server devices, based on receiving the indication.

11. The non-transitory computer-readable medium of claim 8,
where t the indication indicates that the first server device has been added to the plurality of server devices and further indicates that a second server device has been removed from the plurality of server devices at a same time; and
where the one or more instructions, when executed by the one or more processors, further cause the one or more processors to:
determine a first quantity of flows, of the plurality of flows, to reassign from the second server device to remaining server devices, of the plurality of server devices, based on receiving the indication; and
determine a second quantity of flows, of the plurality of flows, to reassign to the first server device from the remaining server devices after determining the first quantity of flows.

12. The non-transitory computer-readable medium of claim 8, where the one or more instructions, when executed by the one or more processors, further cause the one or more processors to:
determine a next server device, of the plurality of server devices, to which to assign a flow, of the plurality of flows, using a linked list,
the next server device being identified by the first information; and
where the one or more instructions, that cause the one or more processors to assign the plurality of flows, further cause the one or more processors to:
assign the flow to the next server device based on determining the next server device.

13. The non-transitory computer-readable medium of claim 8, where the one or more instructions, when executed by the one or more processors, further cause the one or more processors to:
determine a next flow, of the plurality of flows, to reassign using the data structure,
the next flow being identified by the second information; and
where the one or more instructions, that cause the one or more processors to reassign the subset of the plurality of flows, further cause the one or more processors to:
reassign the next flow based on determining the next flow to reassign.

14. The non-transitory computer-readable medium of claim 8, where the one or more instructions, when executed by the one or more processors, further cause the one or more processors to:
determine a total quantity of server devices, included in the plurality of server devices, to be assigned the plurality of flows using the first information;
determine a total quantity of flows, included in the plurality of flows, to be assigned to the plurality of server devices using the second information; and
determine a quantity of flows to assign to each of the plurality of server devices based on determining the total quantity of server devices and the total quantity of flows.

15. A method, comprising:
receiving, by a device, first information identifying multiple server devices and second information identifying multiple flows, the multiple flows to be assigned to the multiple server devices;
assigning, by the device, the multiple flows to the multiple server devices in a first manner based on receiving the first information and the second information;
storing, by the device, the second information in multiple data structures to record the assignment of the multiple flows to the multiple server devices based on assigning the multiple flows to the multiple server devices, a data structure, of the multiple data structures, corresponding to a respective server device of the multiple server devices;
receiving, by device, an indication that a server device has been added to, or removed from, the multiple server devices after storing the second information, the indication being received based on monitoring a link between the device and one of the multiple server devices; and
reassigning, by the device, a subset of the multiple flows in a second manner using third information identifying an order in which the multiple flows were assigned to the multiple server devices based on receiving the indication, the second manner being different from the first manner, and the second manner including a first assigned, first reassigned order.

16. The method of claim 15, where assigning the multiple flows comprises:
assigning the multiple flows to the multiple server devices in a round robin manner, or
assigning the multiple flows to the multiple server devices in a weighted round-robin manner.

17. The method of claim 16, where reassigning the subset of the multiple flows comprises:
reassigning the subset of the multiple flows in a last assigned, first reassigned order.

18. The method of claim 15, further comprising:
identifying a flow, of the multiple flows, to reassign using the second information stored at an end of the data structure,
the second information identifying the flow; and
where reassigning the subset of the multiple flows comprises:
reassigning the flow based on identifying the flow; and
removing the second information identifying the flow from the end of the data structure based on reassigning the flow.

19. The method of claim 15, further comprising:
identifying a flow, of the multiple flows, to assign using the second information; and
where assigning the multiple flows comprises:
assigning the flow to a particular server device, of the multiple server devices, based on identifying the flow; and
storing the second information identifying the flow at an end of the data structure based on assigning the flow to the particular server device,
the data structure corresponding to the particular server device.

20. The method of claim 15, further comprising:
determining a particular server device, of the multiple server devices, to which to assign a flow, of the multiple flows, without using a modulo operation; and
where assigning the multiple flows comprises:
assigning the flow to the particular server device based on determining the particular server device to which to assign the flow.

* * * * *